(12) United States Patent
Legros et al.

(10) Patent No.: US 7,133,910 B2
(45) Date of Patent: Nov. 7, 2006

(54) METHOD FOR RECOVERING THE DATA OF A LOGIC CELL IN A DCE SYSTEM

(75) Inventors: Claude Legros, Gattieres (FR); Michel Melot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/287,235

(22) Filed: Nov. 4, 2002

(65) Prior Publication Data

US 2003/0101256 A1 May 29, 2003

(30) Foreign Application Priority Data

Nov. 23, 2001 (EP) ................................ 01480120

(51) Int. Cl.
*G06F 15/173* (2006.01)
*G06F 9/44* (2006.01)
*G06F 9/445* (2006.01)
*G06F 11/00* (2006.01)
*G06F 17/00* (2006.01)

(52) U.S. Cl. ...................... 709/223; 717/171; 717/176; 714/2; 715/736

(58) Field of Classification Search ........ 717/100–102, 717/106, 124, 126, 128, 103, 168–178; 707/202, 707/204, 10, 101, 200; 709/101, 315, 223, 709/224; 713/1, 200; 714/2, 115, 15, 16; 715/734, 735, 736
See application file for complete search history.

(56) References Cited

U.S. PATENT DOCUMENTS

| | | | | |
|---|---|---|---|---|
| 5,642,505 A | * | 6/1997 | Fushimi ...................... | 707/204 |
| 5,799,322 A | * | 8/1998 | Mosher, Jr. ................. | 707/202 |
| 5,799,323 A | * | 8/1998 | Mosher et al. .............. | 707/202 |
| 5,920,873 A | * | 7/1999 | Van Huben et al. ........ | 707/202 |
| 5,941,955 A | * | 8/1999 | Wilby et al. ................ | 709/242 |
| 5,953,729 A | * | 9/1999 | Cabrera et al. ............. | 707/204 |
| 6,092,086 A | * | 7/2000 | Martin et al. ............... | 707/202 |
| 6,550,057 B1 | * | 4/2003 | Bowman-Amuah ......... | 717/126 |
| 6,567,826 B1 | * | 5/2003 | Fischer et al. .............. | 707/202 |
| 6,658,589 B1 | * | 12/2003 | Taylor .......................... | 714/6 |
| 6,687,846 B1 | * | 2/2004 | Adrangi et al. ................ | 714/4 |
| 6,694,450 B1 | * | 2/2004 | Kidder et al. ................. | 714/15 |
| 6,742,134 B1 | * | 5/2004 | Pothier et al. ................. | 714/4 |

(Continued)

OTHER PUBLICATIONS

R.F. Austen, Replicas View for the Cell Directory Service, Jun. 1, 1992, IBM TDB, TDB n1b p. 120-121.*

*Primary Examiner*—Antony Nguyen-Ba
(74) *Attorney, Agent, or Firm*—Scully, Scott, Murphy & Presser, P.C.; David L. Adour, Esq.

(57) ABSTRACT

A method for recovering data of a cell in a Distributed Computing Environment (DCE) wherein each cell includes a server associated with a database, a DCE administrator workstation with DCE administrator software for managing the cell, and a plurality of users being included in at least one organization. This method comprises the following steps which are automatically performed by the DCE administrator software after initialization by the administrator workstation: a) generating for each organization, the DCE commands necessary for recovering all data associated with the users included in the cell, and b) building an executable program comprising the generated commands and data associated with each user included in the cell, the executable program being used to restore or duplicate the cell.

11 Claims, 2 Drawing Sheets

U.S. PATENT DOCUMENTS

| | | | |
|---|---|---|---|
| 6,785,786 B1 * | 8/2004 | Gold et al. | 711/162 |
| 6,802,025 B1 * | 10/2004 | Thomas et al. | 714/15 |
| 6,816,871 B1 * | 11/2004 | Lee | 707/104.1 |
| 6,816,984 B1 * | 11/2004 | Snyder et al. | 714/38 |
| 6,826,711 B1 * | 11/2004 | Moulton et al. | 714/6 |
| 6,829,688 B1 * | 12/2004 | Grubbs et al. | 711/162 |
| 6,871,295 B1 * | 3/2005 | Ulrich et al. | 714/6 |
| 6,910,151 B1 * | 6/2005 | Qin et al. | 714/6 |
| 6,928,444 B1 * | 8/2005 | Richard | 707/10 |
| 6,931,502 B1 * | 8/2005 | Ohran et al. | 711/162 |
| 6,948,038 B1 * | 9/2005 | Berkowitz et al. | 711/162 |
| 6,978,280 B1 * | 12/2005 | Cochran et al. | 707/202 |

\* cited by examiner

METHOD FOR RECOVERING THE DATA OF A LOGIC CELL IN A DCE SYSTEM

FIELD OF THE INVENTION

The present invention relates to a Distributed Computing Environment (DCE) system wherein the users, machines and resources are distributed in a plurality of logical cells, and relates in particular to a method for recovering the data of a logical cell in a DCE system.

BACKGROUND

A Distributed Computing Environment (DCE) system runs in an AIX environment on a client server mode wherein a distributed application is divided into two parts, one part residing in the user workstation and the other part residing in the server which manages data for several users. The server and the associated users constitute a DCE logical cell which is therefore a collection of machines, users and resources managed by a server. For example, the system could be an organization made up of several departments located in different buildings and operating on their own budgets. In such a case, each department could be associated with one logical cell.

A DCE cell can be configured in many ways depending on the users' requirements. Generally, a cell consists of a part of a network connecting three kinds of nodes: the DCE user workstations, the DCE administrator workstation which is provided with DCE administrator software enabling a DCE administrator to manage the DCE system services in the cell, and a server machine. The Server machine is generally equipped with special software enabling it to provide several DCE services and appears as several servers such as a Cell Directory Server (CDS) listing all the objects present in the cell, a Distributed Time Server (DTS) keeping the clocks of all the machines in the cell, and a Security Server providing the security in the cell. Other server functions may also be present in the cell such as the server function enabling the CDS of the cell to communicate with the CDS of other cells.

In order to maintain the integrity of data in the cell, backups are made periodically. These backups are necessary in case the server crashes or in case of hardware or software problems. The only way to retrieve the data is to restore a full backup (system backup) since two kinds of data must be considered, the data belonging to the users and the data belonging to the DCE system to manage users. A full backup is also required when there is a need to create a new DCE cell in order to manage supplementary users. In such a cell duplication, after installing and configuring the DCE software code on the server of the new cell, the DCE databases have to be built on this server. In both cases of backup/restore or duplication, the users cannot work during all the time taken by the operation. Therefore, such an operation cannot be made frequently in order to avoid stopping the user work, thereby resulting in the risk of losing data within the interval between two backup operations.

SUMMARY

Accordingly, an object of the invention is to achieve a method for automatically recovering the data in a DCE cell which allows users to continue working during the backup operation.

Another object of the invention is to achieve a method for automatically recovering the data in a data cell wherein there is no full backup operation but only the backup of the data contained in the databases without the backup of the structure of these databases.

The invention relates therefore to a method for automatically recovering the data of a cell in a DCE system comprising at least a cell and wherein each cell includes at least a server associated with a database, a DCE administrator workstation associated with DCE administrator software for managing the cell, and a plurality of users included in at least one organization. This method comprises the following steps which are automatically performed by the DCE administrator software after initialization by the administrator workstation:

a) generating for each organization, the DCE commands necessary for recovering all data associated with the users included in the cell, and b) building an executable program comprising the generated commands and data associated with each user included in the cell, such an executable program being used to restore or duplicate the cell.

An advantage of the method according to the invention is that it can be performed frequently, for instance every night, thus limiting the risk of losing data within the interval between two backups.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION

Figure 1:
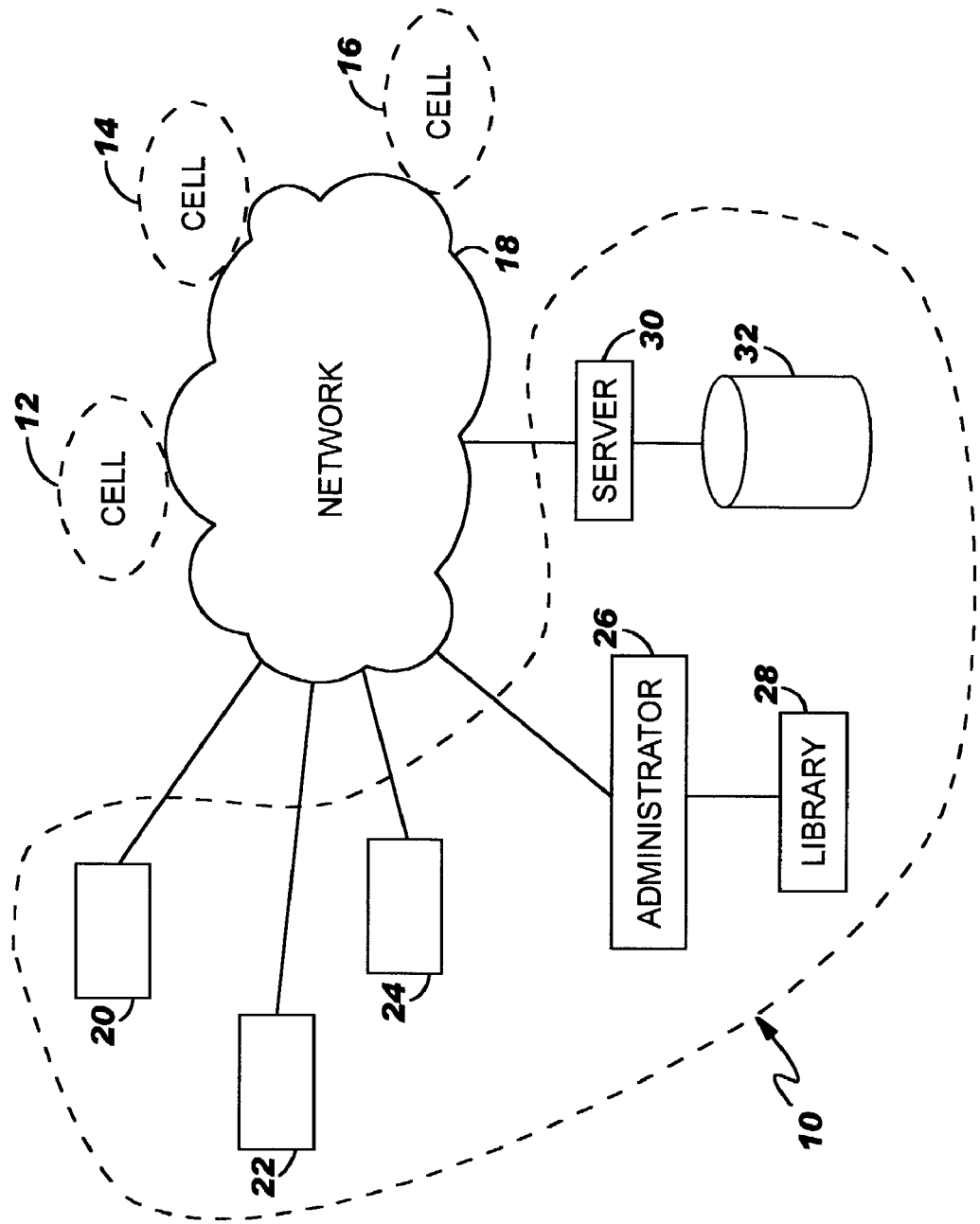
FIG. 1 is a block diagram representing schematically a DCE system including several logical cells wherein the method according to the invention may be implemented.

Referring to FIG. 1 a DCE system wherein the invention may be implemented is divided in a plurality of logical cells such as cells 10, 12, 14 or 16 which are all connected to a network 18 such as an Intranet network.

Each logical cell such as cell 10 includes several user workstations 20, 22, 24 connected to network 18, an administrator workstation 26 also connected to network 18 with access to a library 28 containing the software necessary for the administrator to manage cell 10, and a server 30 connected to network 18 with its databases 32. These contain the software enabling the server to provide one or more of the DCE services upon request from a user. Note that server 30 can designate several server machines including several servers such as a Cell Directory Server (DCS) listing all the objects present in the cell, a Distributed Time Server (DTS) keeping the clocks of all the machines in the cell, and a Security Server providing the security in the cell.

One of the databases 32, the Registry database managed by the Security Server, is essential for the method according to the invention since it contains all the user data to be recovered.

The Registry database contains 5 kinds of objects. The first object is the "Organization". It supports two kinds of attributes: the Organization attributes which consist of the organization name, the Universal Unique Identifier (UUID) and the organization identifier which may have default values or not, and the Policy attributes which regulate such things as account and password lifetimes for all accounts associated with a particular organization which have a default value set for the Registry as a whole with the registry modify command.

The second object is a "Group" which contains members called "Principals" and "Accounts" which are the third and fourth kinds of objects. The "Account" object is identified by a principal name and includes specific attributes such as client, organization, groups, etc. The "Principal" object includes specific attributes such as alias, user ID, full name, etc. The fifth kind of objects is the "User" object which represents all the data associated with a user, that is the Registry information and a CDS directory in the default implementation. This object allows the administrator to easily manage "Principals" and "Accounts" or delete them if necessary.

Figure 2:
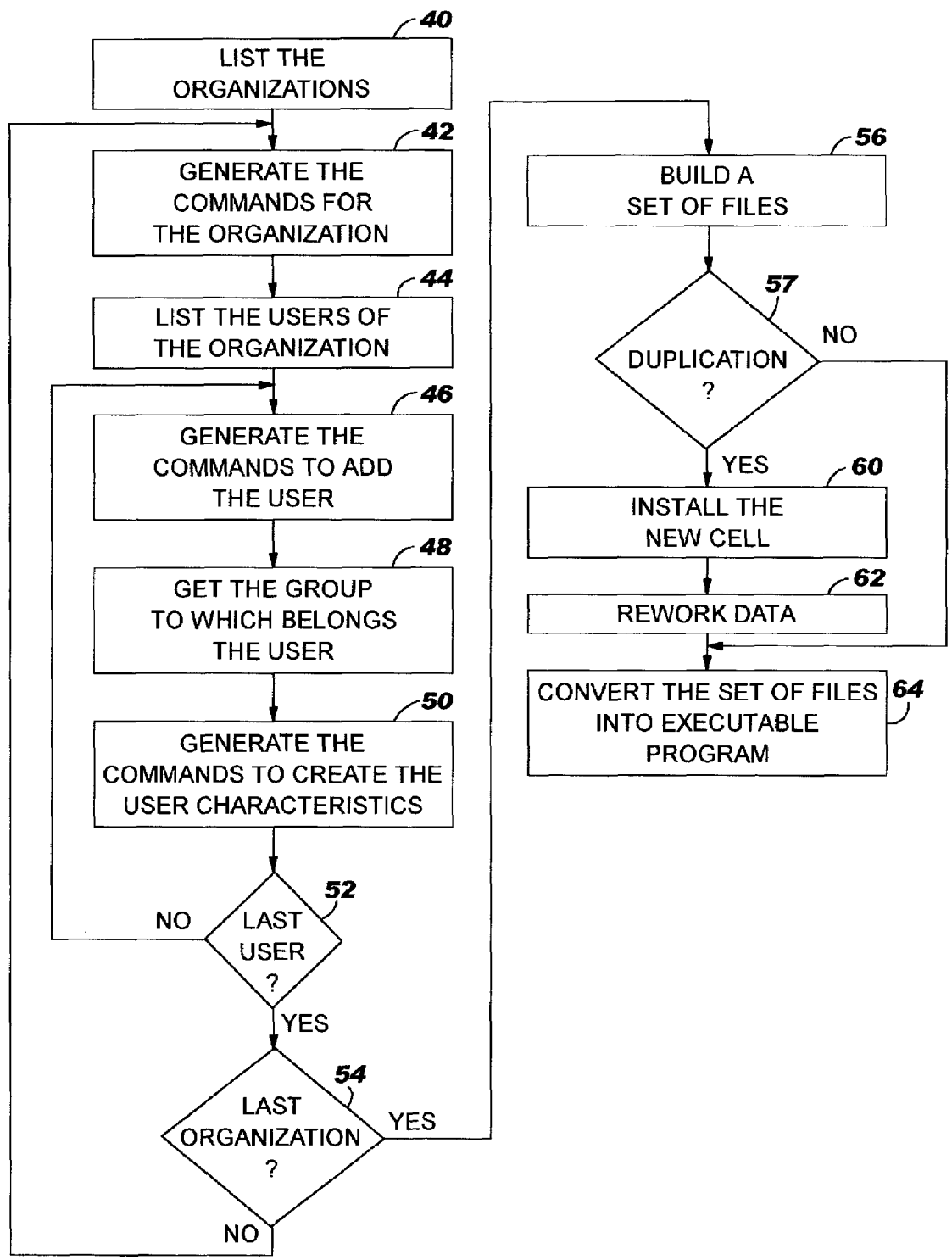
FIG. 2 is a flow chart representing the steps of the method according to the invention.

Referring to FIG. 2, the method according to the invention can apply when it is necessary to recover the data of a cell, that is in case of backup/restore or in case of duplication of a cell. First, the tool which is stored in the library 28 at the disposal of the administrator workstation 26, lists all the organizations of the cell (step 40), that is extracts the data defining each organization. For each organization, the DCE commands necessary to create the organization are generated (step 42) and stored into a specific file.

Then, for each organization, the tool lists the users belonging to this organization (step 44), that is extracts the data associated with each user and generates the commands necessary to add each user to the organization (step 46), these commands being then stored in a specific file. For each user, the tool gets its characteristics and particularly the group to which the user belongs (step 48), and the DCE commands necessary to create the group, the account and the principal associated with the user and to add the user to the group are generated (step 50) and stored into a specific file.

Then, a check is made to determine whether the user being processed is the last one (step 52). If not, the process returns to step 46 of generating the commands to add the DCE user to the organization. If the user is the last one of the organization, a test is made to determine whether the organization being processed is the last one (step 54). If not, the process returns to step 42 of generating the commands for a new organization of the cell.

When all the organizations of the cell have been processed, a set of files containing all the DCE commands necessary to recover the cell and containing all the user data is built (step 56). At this stage, it is checked whether the purpose of the processing is a duplication or a backup/restore (step 58). If it is a duplication, a new cell has to be installed by configuring the DCE software server code and building the structure of the DCE databases (32) of the new cell server (step 60). Also, the data obtained in the set of files have to be reworked in order to take into account the naming convention specific to the new cell (step 62). Finally, the set of files reworked in case of duplication or not in case of backup/restore are converted into an executable program which can be sent to the cell for being executed on the server of the cell (step 64).

We claim:

1. A method for automatically recovering the data of a cell in a Distributed Computing Environment (DCE) system comprising at least a cell and wherein each cell includes at least a server associated with a database, a DCE administrator workstation associated with DCE administrator software for managing the cell and a plurality of users, said users being included in a plurality of organizations; said method comprising the following steps, which are automatically performed by said DCE administrator software after initialization by said administrator workstation:

in response to a request for a backup or duplicate operation, listing all of said plurality of organizations by extracting from the cell data defining each of said organizations, and generating for each of said organizations, DCE commands necessary for recovering all data associated with the users included in said cell including data to manage said users, including the step of for each of said plurality of organizations, generating DCE commands necessary to create the organization and to list all users belonging to the organization; and building an executable program comprising said generated DCE commands and data associated with each user included in the cell, said executable program being used to restore or duplicate said cell.

2. The Method according to claim 1, wherein the step of generating includes the following steps for each organization:

generating DCE commands necessary to add each user to said organization; and generating DCE commands to create user characteristics of the users.

3. The method according to claim 2, comprising the following step performed before the step of generating DCE commands to create characteristics of the users:

getting a group within said organization to which said user belongs.

4. The method according to claim 3, further comprising the step of building a set of files containing both DCE commands and data.

5. The method according to claim 4, used to backup data belonging to users and data used by the DCE administrator to manage the users of said cell.

6. The method according to claim 4, used to duplicate a cell, further comprising the step of installing a new cell and configuring DCE software server code on a server of said new cell.

7. The method according to claim 6, further comprising the step of reworking data of said set of files in order to take into account a naming convention specific to said new cell.

8. The method according to claim 7, wherein said set of files is converted into an executable program.

9. The method according to claim 8, wherein said executable program is sent to the new cell being duplicated in order to be executed.

10. A method according to claim 2, wherein the step of generating DCE commands necessary to create said organization includes the steps of:

generating all the DCE commands necessary to create said organization; and storing said all the DCE commands in one file.

11. A method according to claim 1, wherein all of the data needed to duplicate said all data associated with the users included in said cell, are contained within a single database; and said building step includes the step of accessing only said single database for recovering said all data associated with the users included in said cell.

* * * * *